(12) United States Patent
Diem et al.

(10) Patent No.: US 8,733,327 B2
(45) Date of Patent: May 27, 2014

(54) CHARGE AIR DUCT FOR AN INTERNAL COMBUSTION ENGINE

(75) Inventors: Johannes Diem, Weissach (DE); Ulrich Dehnen, Kornwestheim (DE); Achim Rehmann, Kieselbronn (DE); Bernhard Huurdeman, Freiberg a.N. (DE); Karl-Ernst Hummel, Bietigheim-Bissingen (DE)

(73) Assignees: Behr GmbH & Co. KG, Stuttgart (DE); Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/274,669

(22) Filed: Oct. 17, 2011

(65) Prior Publication Data

US 2012/0090579 A1    Apr. 19, 2012

Related U.S. Application Data

(63) Continuation of application No. PCT/EP2010/002246, filed on Apr. 12, 2010.

(30) Foreign Application Priority Data

| Apr. 17, 2009 | (DE) | 10 2009 017 555 |
| Jun. 10, 2009 | (DE) | 10 2009 025 036 |
| Mar. 12, 2010 | (DE) | 10 2010 011 372 |
| Mar. 12, 2010 | (DE) | 10 2010 011 373 |

(51) Int. Cl.
*F02B 29/04* (2006.01)

(52) U.S. Cl.
USPC .......................................... 123/542; 123/563

(58) Field of Classification Search
USPC ................................................. 123/542, 563
See application file for complete search history.

(56) References Cited

U.S. PATENT DOCUMENTS 5,911,212 A    6/1999   Benson
6,006,730 A *  12/1999  Rutke et al. ............... 123/542

(Continued)

FOREIGN PATENT DOCUMENTS

DE    42 40 239 A1    6/1994
DE    103 43 756 A1   4/2004

(Continued)

OTHER PUBLICATIONS

Chinese Office Action for Chinese Application No. 201080026500.2 dated Nov. 26, 2013 with English translation.

*Primary Examiner* — M. McMahon
(74) *Attorney, Agent, or Firm* — Muncy, Geissler, Olds & Lowe P.C.

(57) ABSTRACT

A charge air duct for an internal combustion engine includes a housing with at least one entrance and at least one exit for charge air, a first heat exchanger arranged inside the housing to cool the charge air, a bypass arranged on the housing to at least partially circumvent the heat exchanger, and an actuator arranged on the housing to influence the charge air flow. The charge air is guided from the entrance to the first heat exchanger in a first position of the actuator and from the entrance to the bypass in a second position of the actuator, and the bypass leads upstream of a second heat exchanger of the charge air duct.

14 Claims, 8 Drawing Sheets

(56) References Cited

U.S. PATENT DOCUMENTS

| | | |
|---|---|---|
| 6,868,840 B2 | 3/2005 | Lewallen |
| 2002/0195086 A1 | 12/2002 | Beck et al. |
| 2003/0037913 A1 | 2/2003 | Knecht et al. |
| 2004/0244782 A1 | 12/2004 | Lewallen |
| 2005/0005919 A1 | 1/2005 | Tyler |
| 2005/0051145 A1* | 3/2005 | Joyce et al. ............... 123/563 |
| 2006/0151157 A1 | 7/2006 | Kammler |
| 2008/0149080 A1* | 6/2008 | Reuss et al. ............ 123/568.12 |
| 2009/0013977 A1 | 1/2009 | Brecheisen, II |
| 2009/0020079 A1* | 1/2009 | Muller et al. ............... 123/41.1 |
| 2009/0050117 A1 | 2/2009 | Tai et al. |
| 2009/0071450 A1* | 3/2009 | Doring et al. ............... 123/563 |
| 2009/0090492 A1 | 4/2009 | Ablitzer et al. |
| 2010/0132355 A1 | 6/2010 | Michels et al. |
| 2010/0263375 A1* | 10/2010 | Grieve ............................. 60/612 |
| 2011/0000469 A1* | 1/2011 | Lauberts et al. ............ 123/564 |

FOREIGN PATENT DOCUMENTS

| | | |
|---|---|---|
| DE | 10 2006 009 298 A1 | 9/2007 |
| DE | 10 2006 057 488 A1 | 6/2008 |
| DE | 10 2007 040 661 A1 | 3/2009 |
| DE | 10 2007 043 992 A1 | 3/2009 |
| DE | 10 2008 006 049 A1 | 7/2009 |
| DE | 10 2008 008 697 A1 | 8/2009 |
| DE | 10 2008 032 388 A1 | 1/2010 |
| EP | 1 512 853 A2 | 3/2005 |
| EP | 1 845 242 A2 | 10/2007 |
| EP | 2 048 416 A2 | 4/2009 |
| EP | 2 161 429 A2 | 3/2010 |
| FR | 2 916 020 A1 | 11/2008 |
| FR | 2 920 853 A1 | 3/2009 |
| JP | 60050225 A | 3/1985 |
| JP | 61061916 A | 3/1986 |
| WO | WO 2005/019619 A1 | 3/2005 |
| WO | WO 2007/097750 A1 | 8/2007 |

* cited by examiner

CHARGE AIR DUCT FOR AN INTERNAL COMBUSTION ENGINE

This nonprovisional application is a continuation of International Application No. PCT/EP2010/002246, which was filed on Apr. 12, 2010, and which claims priority to German Patent Applications No. DE 10 2009 017 555.5, which was filed in Germany on Apr. 17, 2009, DE 10 2009 025 036.0, which was filed in Germany on Jun. 10, 2009, DE 10 2010 011 372.7, which was filed in Germany on Mar. 12, 2010, and DE 10 2010 011 373.5, which was filed in Germany on Mar. 12, 2010, and which are all herein incorporated by reference.

BACKGROUND OF THE INVENTION

1. Field of the Invention

The invention relates to a charge air duct for an internal combustion engine.

2. Description of the Background Art

DE 10 2007 040 661 A1 describes an intake manifold for an internal combustion engine, having an integrated heat exchanger through which coolant flows to cool charge air. By using a first regulating flap, a charge air flow can be directed through the heat exchanger or a bypass duct in an adjustable manner. A second, separate regulating flap also performs the function of a throttle valve.

SUMMARY OF THE INVENTION

The problem addressed by embodiments of the invention is that of providing a charge air duct comprising a heat exchanger to cool charge air which can be easily adapted to different operating situations. The arrangement of the bypass makes an operating mode possible in which the charge air circumvents the first heat exchanger but not the second heat exchanger. Therefore, the charge air is still cooled by the second heat exchanger, and a pressure drop is simultaneously diminished. Such a circumvention of only the first heat exchanger may be advantageous in particular, but not necessarily, in part-load operation of the internal combustion engine.

In an embodiment of the invention, the functions can be integrated, wherein the charge air routing can be adapted to various operating conditions using a single actuator. In particular, in the case of a diesel engine, this is normal operation (exhaust gas directed through both heat exchangers), cold-start operation and/or part-load operation (exhaust gas directed through the bypass or only the second heat exchanger), and throttle operation (for example, to regenerate a particle filter and/or to shut off the engine). According to embodiments of the invention, charge air is understood to be compressed air either with or without admixtures of recirculated exhaust gas. These embodiments can beneficially be used with diesel engines, although they can also be used in spark ignition engines or other internal combustion engines, depending on the requirements.

In an embodiment of the invention, the first heat exchanger is in the form of a high temperature heat exchanger (HT), and the second heat exchanger is in the form of a low temperature heat exchanger (NT). This makes effective cooling possible under full load or routing through both heat exchangers. In addition, the HT heat exchanger can be circumvented rapidly and immediately when transitioning to part-load operation, thereby preventing the charge air from heating up. In particular, a control strategy for switching the actuator can be provided, according to which the temperature of the inflowing charge air is compared to that of a cooling fluid of the HT heat exchanger and, if it is lower, appropriate circumvention through the bypass takes place.

Typically, although not necessarily, engine coolant having usual operating temperatures of 90° C., for example, flows through a high temperature heat exchanger, while colder coolant from a low temperature branch of the cooling system, for instance, flows through the low temperature heat exchanger. In sum, it is thereby possible to prevent the charge air from being heated up by the first heat exchanger under operating conditions such as part-load operation when the engine is at operating temperature. In the part-load range, the charge air can emerge from the compressor at temperatures below the main coolant temperature or less than 90° C. In this manner the efficiency of charge air cooling and, therefore, the internal combustion engine can be improved in the part-load range.

In one possible but not necessary embodiment of the invention, the charge air duct exclusively comprises a bypass routed in the aforementioned manner, thereby ensuring that the charge air is always routed at least through the other heat exchanger.

In another embodiment of the invention, a second bypass is also provided, wherein the second bypass leads downstream of the second heat exchanger. Both heat exchangers can therefore be circumvented entirely as necessary, such as during a cold start or other specific operating conditions. This can take place in conjunction with exhaust gas recirculation, thereby making it possible to prevent condensate from forming on the heat exchangers, which is beneficial in particular under cold start conditions. This can also take place in conjunction with exhaust gas recirculation, thereby making it possible to prevent condensate from forming on the heat exchangers, which is beneficial in particular under cold start conditions. In still another embodiment, in a further integration of the functions, the charge air flows from the inlet to the second bypass in a third position of the actuator. Alternatively, an additional actuator can also be provided to switch the second bypass, wherein the second bypass is in the form of a closable extension of the first bypass, for example.

In a further embodiment of the invention, the charge air duct is in the form of an intake manifold of the internal combustion engine. In this manner a compact, integrated unit comprising a heat exchanger and actuator is created, which can be mounted directly on a cylinder heat of the engine, and permits cooling and charge air routing that differs according to the operating mode.

In another embodiment, the actuator is disposed in a duct which is may be substantially cylindrical, wherein, in one possible detailed embodiment, the charge air flow is redirected by approximately 90° in the region of the duct. Such an arrangement of the actuator makes it possible to attain high charge air throughput rates using a small, space-saving design.

In yet another embodiment of the invention, the actuator is in the form of a roller which is rotatable about an axis. This results in a compact and reliable design. The roller can be in the form of a hollow roller, for instance, wherein the charge air flow enters the roller in the axial direction and emerges through a radial opening in the roller wall. Depending on the position of the roller in the rotational direction, the opening overlaps a supply to the heat exchanger or an opening of the bypass entirely, partially, or not at all.

Furthermore, the actuator may comprise a blocking surface, wherein the blocking surface has a geometric structure to reduce the flow cross-section. Such a geometric structure can be in the approximate form of a serrated edge of the actuator, such as an edge of the opening of a hollow roller, or as defined openings in the region of the edge. The wall of the hollow roller forms the blocking surface. It is thereby possible, in particular, to adjust a flow cross-section exactly using the actuator. It is also possible, by way of the geometric structure, to attain a non-linear relationship between the flow cross-section and a motion of the actuator. Such measures make it possible to also use the actuator particularly well as a throttle valve of a spark ignition engine, in which case the requirements for the accuracy of the flow cross-section that is set are particularly high in general.

In a compact and effective design of a charge air duct according to an embodiment of the invention, the housing comprises a redirection region to redirect the charge air in the shape of a "U", wherein, the redirection region may be disposed downstream of the heat exchanger, and upstream of a further heat exchanger. As such, the available space in the engine compartment can be utilized well, and a two-stage configuration of the charge air cooling through separate heat exchangers can be attained. Alternatively, the heat exchanger and the further heat exchanger can also be different sections of a single heat exchanger.

The housing may be composed of at least two housing parts. After assembly, the housing parts can be welded to one another, screwed together, or attached to one another in any other manner. The housing parts may be made of a plastic such as a polyamide.

For further optimization, a tension rod may be provided on the housing, wherein the tension rod reinforces a housing wall in the region of a seal of the actuator. Leaks in the region of the seal are thereby prevented if vibrations and/or high temperatures and pressures occur.

In another embodiment, the actuator rests against at least one seal in a gliding manner to prevent leakage flow of the charge air through a path that is unwanted depending on the position of the actuator. The seal can be integrally cast onto the housing.

The housing may also comprise multiple walls, at least in sections, wherein, in one possible detailed embodiment, coolant flows between the housing walls. As an alternative or in addition to allowing coolant to flow through, a heat protection sheet made of metal, for example, can also be provided. In general, this makes it possible to use low-cost plastics such as polyamides for the housing itself if charge air temperatures above 200° C. occur in certain regions.

In a further embodiment of the invention, the housing can be attached to the internal combustion engine via two parallel rows of screw connections, wherein, in a optional embodiment, at least one of the screw connections extends through a part of the housing. Attachment to the gas inlet-side flange of the internal combustion engine with a particularly minimal load is thereby made possible.

In a variant of these embodiments, at least one of the heat exchangers is disposed between the parallel rows of screw connections, and is therefore situated in a space-saving manner and is well-protected against vibrations. It is also possible to situate both heat exchangers between the parallel rows of screw connections. Depending on the requirements on the installation space, the second heat exchanger can also be located outside of the row of screw connections, such as above a top row of screw connections or below a bottom row of screw connections. Greater installation height of the heat exchanger located outside of the rows of screw connections is thereby also made possible. In all stated embodiments, it may be beneficial that no screw connections extend through the region of the network or the active cooling surface of a heat exchanger, since this is rather difficult to attain for many types of heat exchangers.

In modifications that may be useful depending on the installation space requirements, the heat exchangers can have either a different length or the same length transverse to the flow direction. An identical length is useful with respect to an identical part concept and blending the flow resistances at the heat exchangers. In a design based on different heat exchanger lengths, available installation space can be utilized in a particularly optimal manner.

In the interest of a compact, short design, the charge air flow is redirected, in particular by 180°, after the heat exchanger of the two that is upstream, and before the heat exchanger of the two that is downstream. The charge air flow can be redirected further after the heat exchanger of the two that is downstream. In a first detailed embodiment, this can take place in the form of a guide curved around the actuator. In an alternative or supplemental embodiment, the redirection is by at least 90°. The sequence of redirections can form, overall, a U-flow heat exchanger or an S-flow heat exchanger, for example. In both of the aforementioned detailed embodiments, the rotational direction of the redirections of the charge air flow can change signs throughout the route of the charge air duct, thereby ensuring that the air exiting the heat exchangers is mixed thoroughly, with little or no drop in pressure.

In embodiments of the invention, the number of screw connections is either four, such as for connection to a three-cylinder engine, or five, such as for connection to a four-cylinder engine. As a result, the number of screw connections is kept to a minimum, wherein load-free and secure retention of the charge air duct on the internal combustion engine is simultaneously ensured.

To help ensure simple and secure installation, a recess for the screw connection extending through the housing is designed as a single piece with the housing and is made of the same material. Depending on the installation space, the recess can be in the form of a channel or a tunnel, wherein both variants can be provided on the same charge air duct. Such a recess can be produced during an injection molding process used to produce a part of the housing or the entire housing out of plastic. Basically, any type of housing material other than plastic is also feasible, such as aluminum.

In another embodiment, the heat exchanger comprises a stack of flat tubes, wherein a cooling fluid flows through the flat tubes, and the charge air flows around the flat tubes. The flat tubes can be disposed approximately between an upper tank and a lower tank. Both connectors for the coolant flowing through the flat tubes may be provided on one of the tanks. Flat tubes, fins that can be optionally provided between the flat tubes, tanks and, depending on the requirements, the coolant connections, can be soldered in a soldering oven as one cassette-type aluminum heat exchanger.

In a further embodiment, a throttle element is provided in addition to the actuator, and the charge air can be blocked completely via the throttle element. Such a complete blockage can be used to reliably shut off a diesel engine, for example. In addition, the throttle element can serve as support to provide sufficient vacuum, e.g. for exhaust gas recirculation in the part-load range. In regard to the actuator, it is possible, in general, to omit the capability to attain strong throttling or to only block the charge air flow entirely, thereby reducing design complexity with respect to sealing the actuator. When the actuator is designed in the shape of a roller, in particular, the design thereof can be kept simple.

In a further possible embodiment comprising two heat exchangers, it may be provided that the charge air is directed from the inlet to a second bypass in a fourth position of the actuator, wherein the second bypass leads downstream of the further heat exchanger. It is thereby possible to entirely circumvent the heat exchangers or adjust the charge air cooling under related operating conditions such as a cold start. Depending on the requirements on installation space, in an embodiment comprising two heat exchangers, the actuator is disposed substantially in a plane containing both heat exchangers, in particular also in a plane containing the outlet of the charge air duct. In such a configuration, the guidance of the screw connections for attaching the charge air duct to the internal combustion engine can be attained in a particularly simple manner.

In an alternative embodiment, it can also be provided that the two heat exchangers and the outlet are disposed substantially in a plane, wherein the actuator is disposed outside of this plane, in particular entirely above or entirely below the plane. Such a design is particularly compact and short, thereby making it possible to optimally utilize the installation space that is available in many cases for a charge air duct next to the internal combustion engine.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

Further advantages and features of the invention will become apparent from the embodiment described below, and from the dependent claims.

An embodiment of the invention is described below, and is explained in greater detail with reference to the attached drawings.

Figure 1:
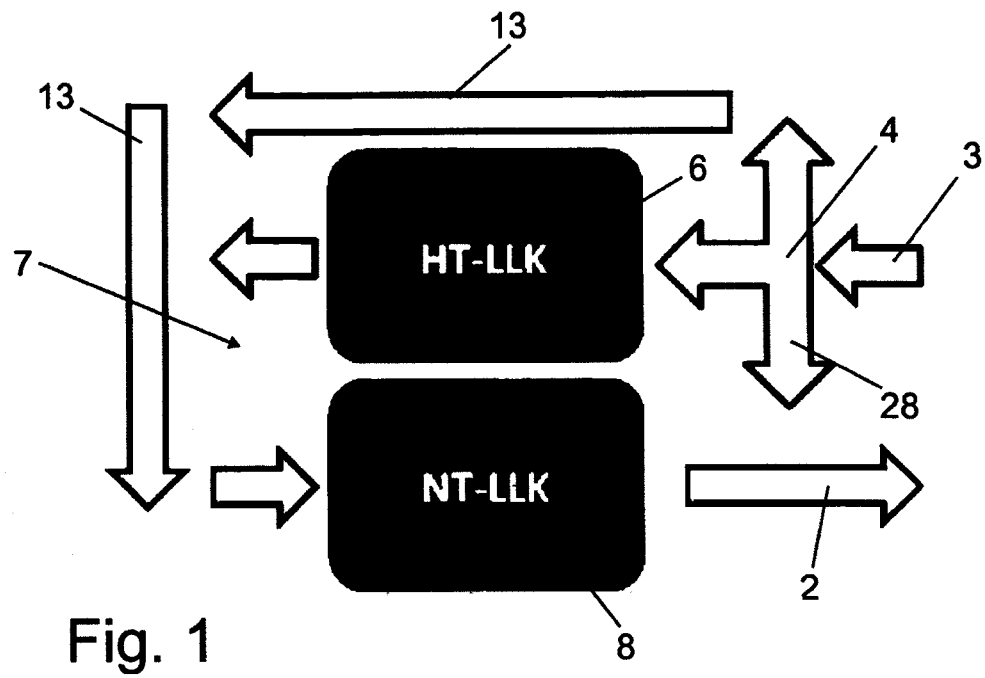

The present invention will become more fully understood from the detailed description given hereinbelow and the accompanying drawings which are given by way of illustration only, and thus, are not limitive of the present invention, and wherein:

FIG. 1 shows a schematic depiction of a first embodiment of a charge air duct according to an embodiment of the invention.

Figure 2:
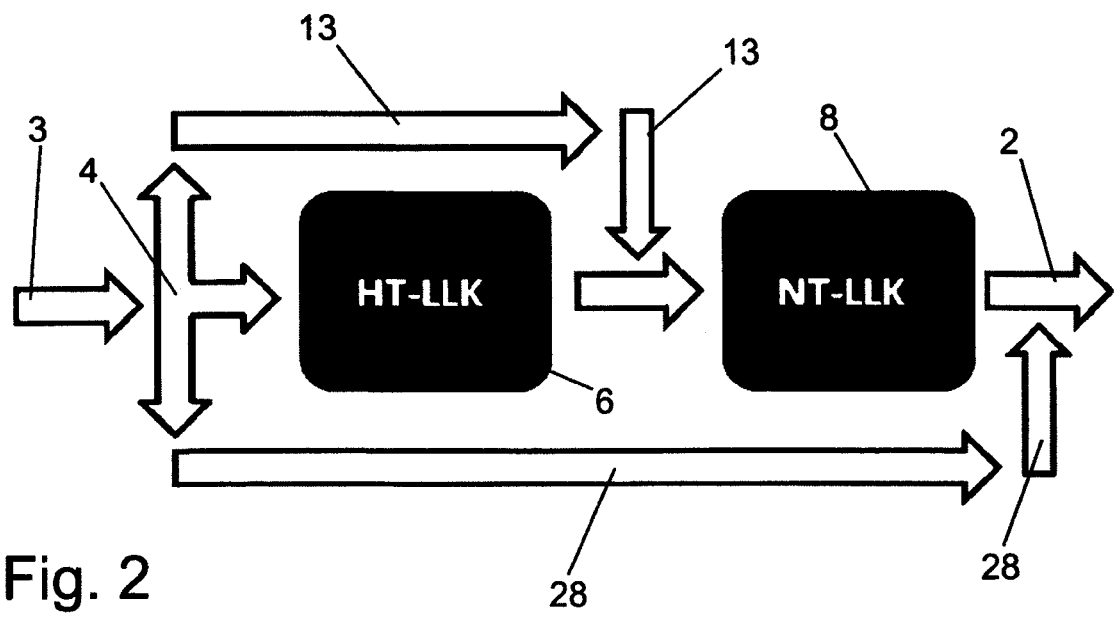

FIG. 2 shows a schematic depiction of a second embodiment of a charge air duct.

Figure 3:
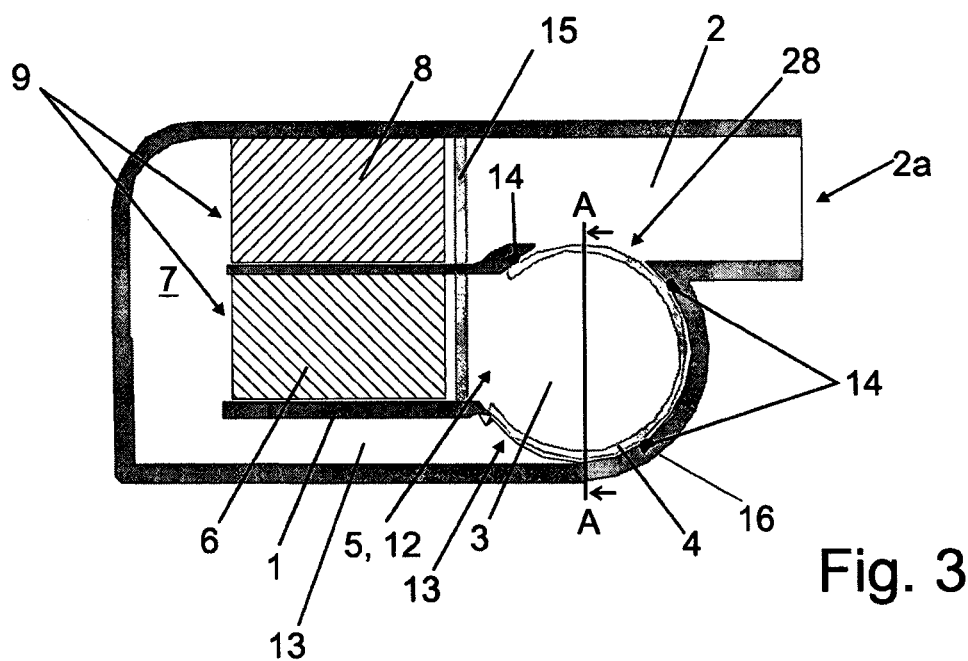

FIG. 3 shows a schematic sectional view through a detailed embodiment of a charge air duct according to FIG. 1 in a first position of an actuator.

Figure 4:
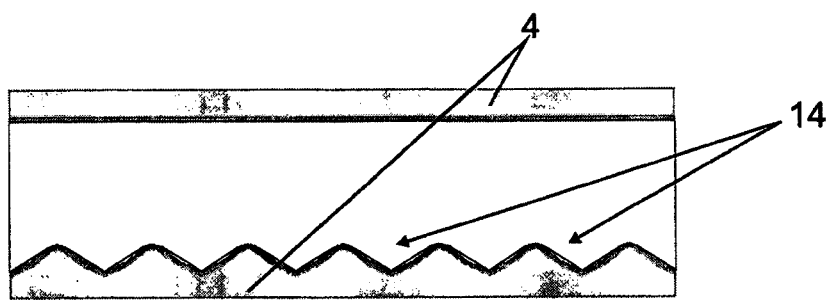

FIG. 4 shows a sectional view along the line A-A from FIG. 3.

Figure 5:
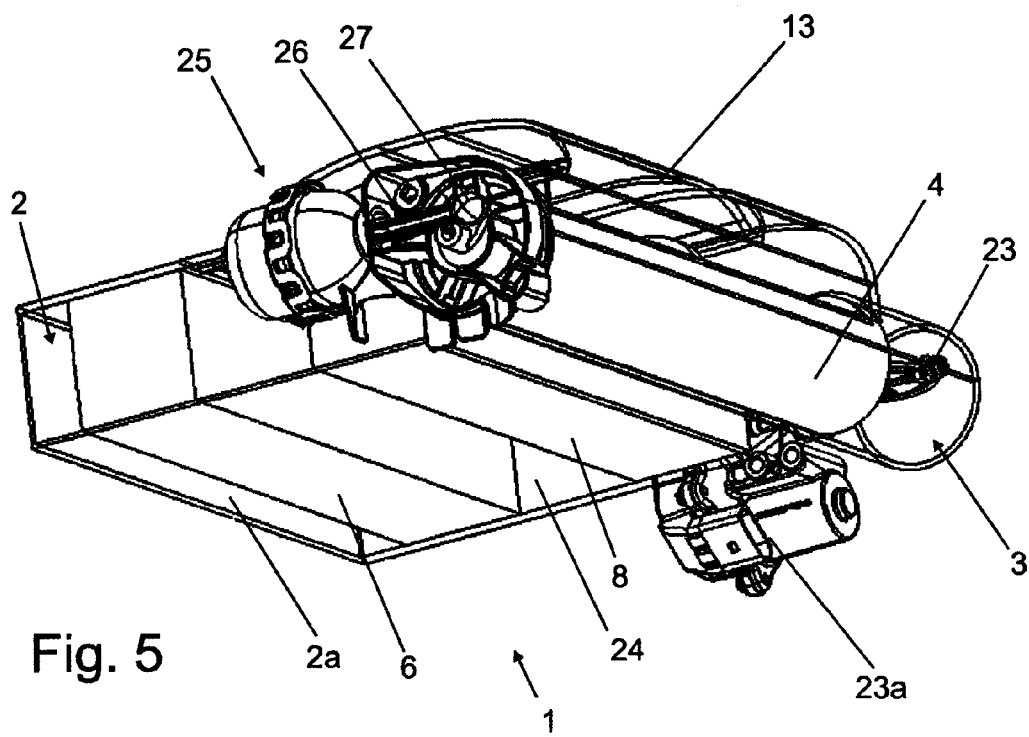

FIG. 5 shows a spatial view of a further embodiment of the invention.

Figure 6:
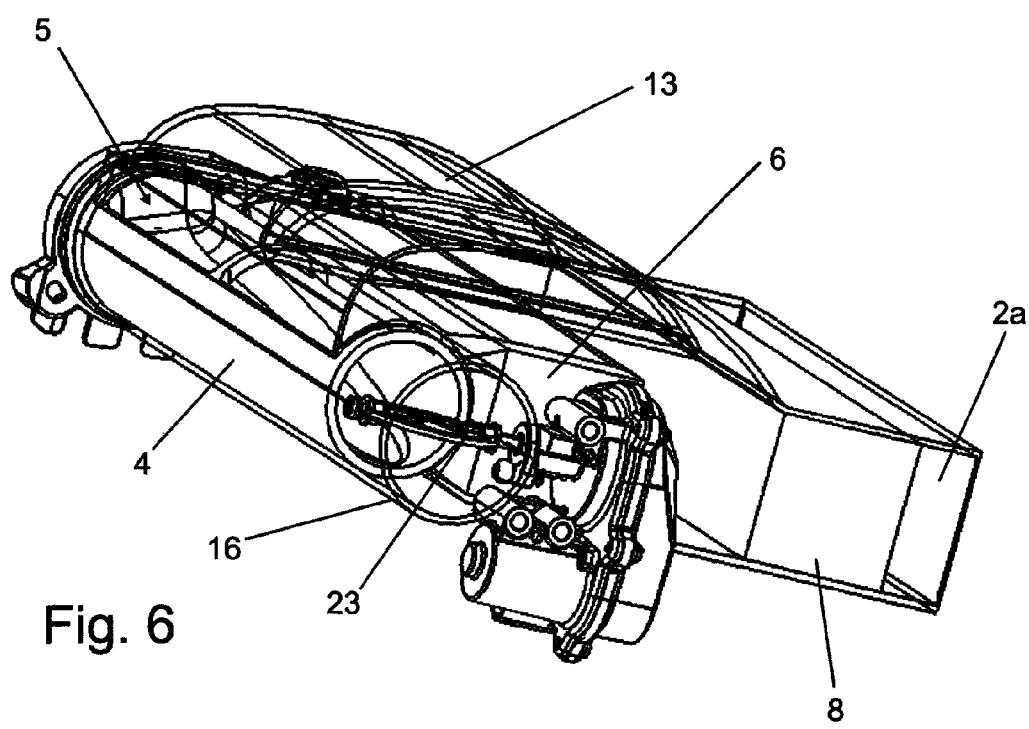

FIG. 6 shows a further spatial view of the embodiment from FIG. 5.

Figure 7:
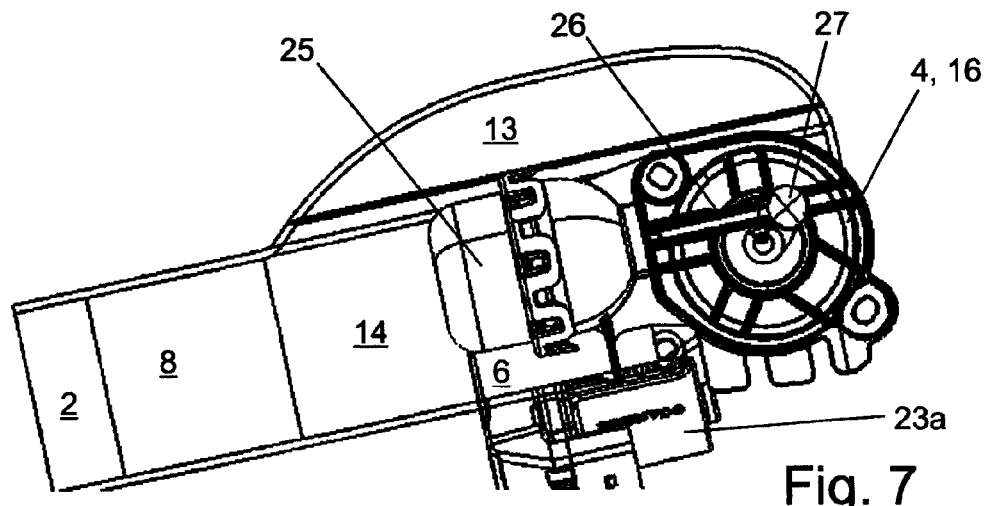

FIG. 7 shows a lateral plan view of the embodiment from FIG. 5.

Figure 8:
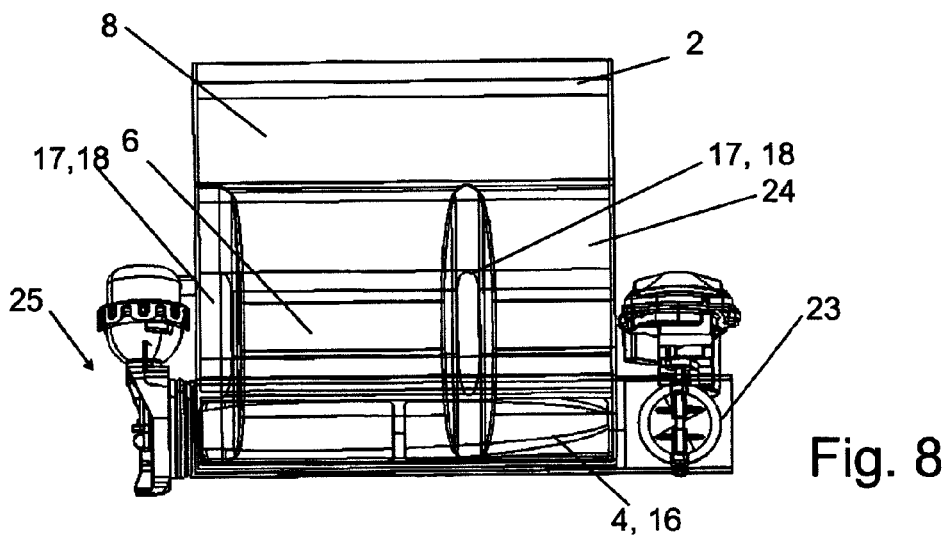

FIG. 8 shows a plan view from above of the embodiment from FIG. 5.

Figure 9:
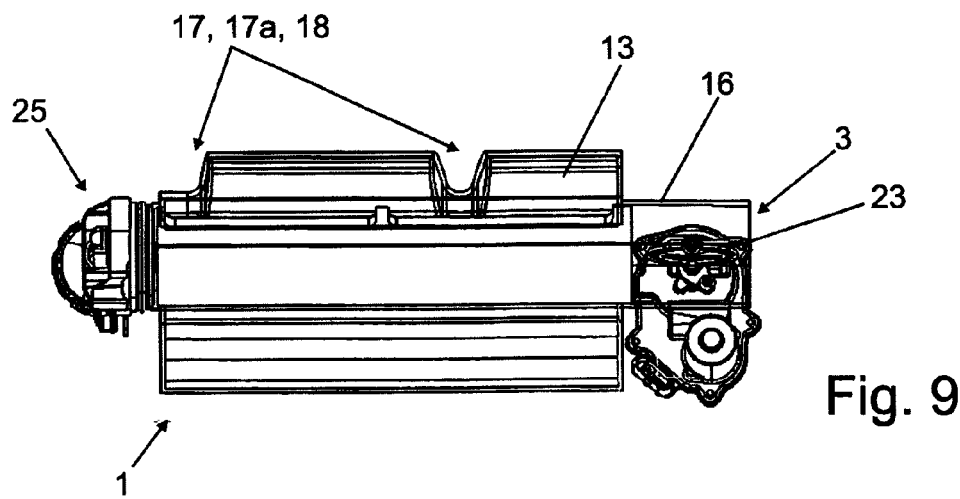

FIG. 9 shows a plan view of the front of the embodiment from FIG. 5.

Figure 10:
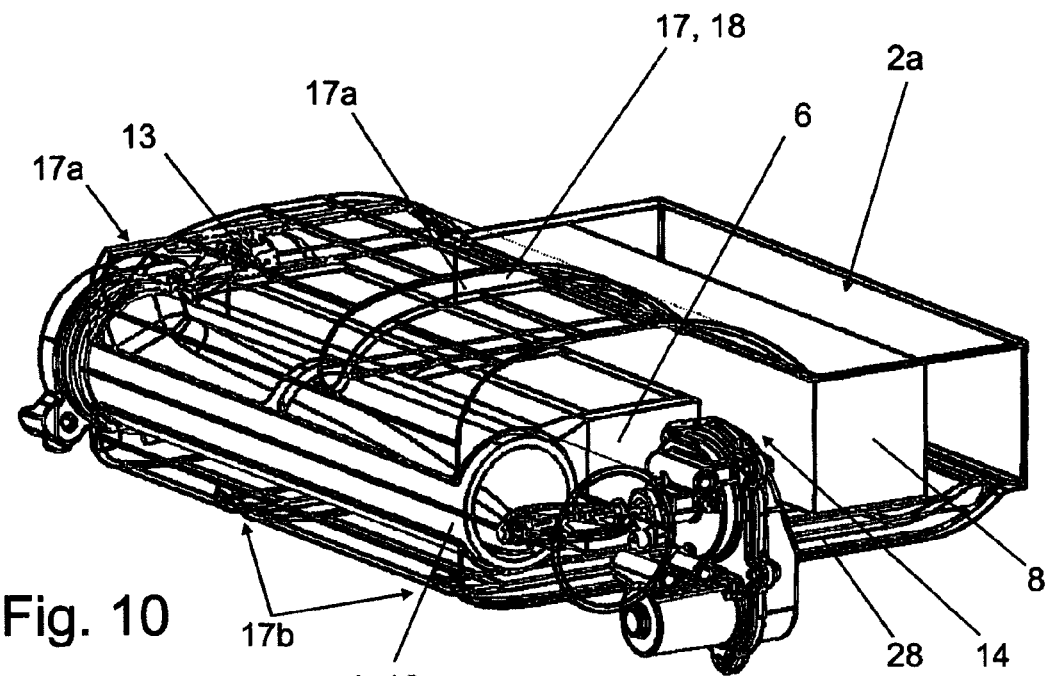

FIG. 10 shows a spatial view of a further embodiment of the invention.

Figure 11:
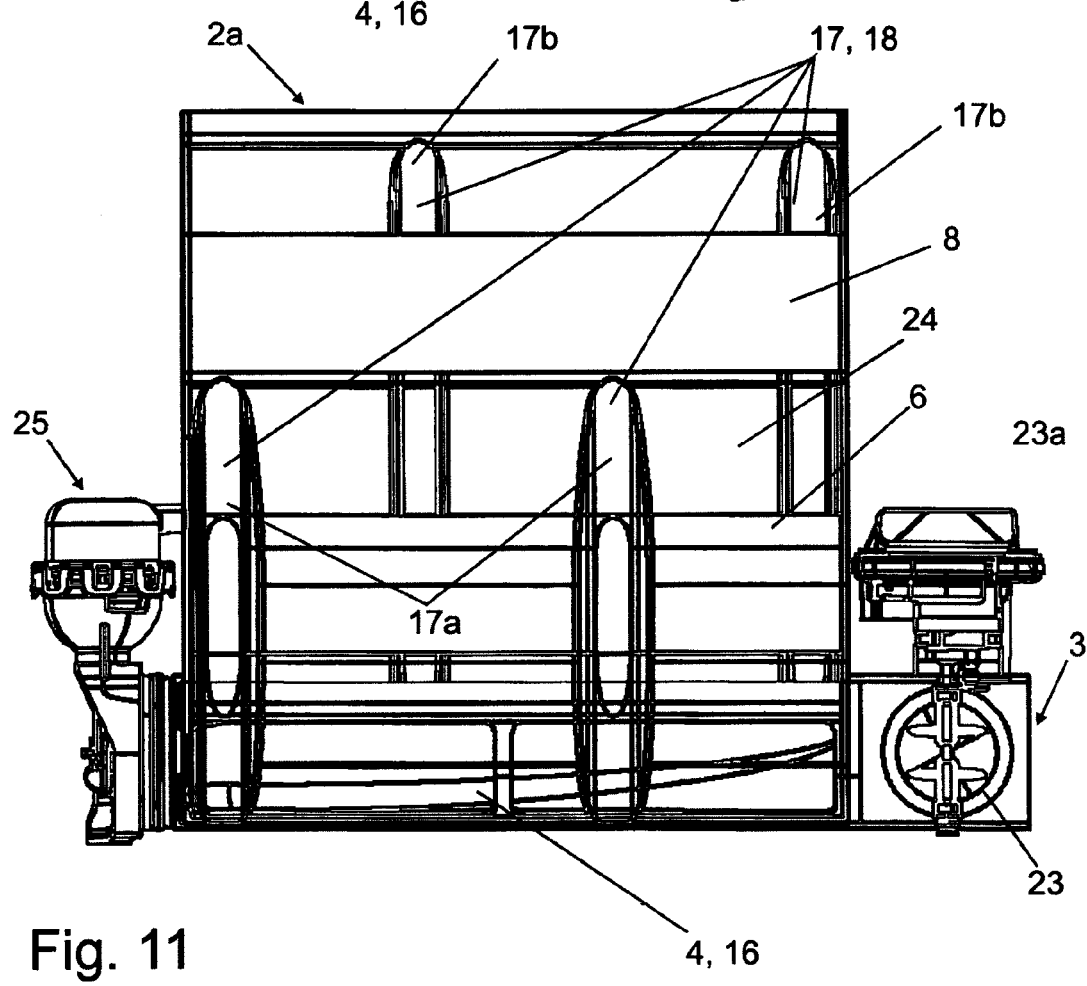

FIG. 11 shows a plan view from above of the embodiment from FIG. 10.

Figure 12:
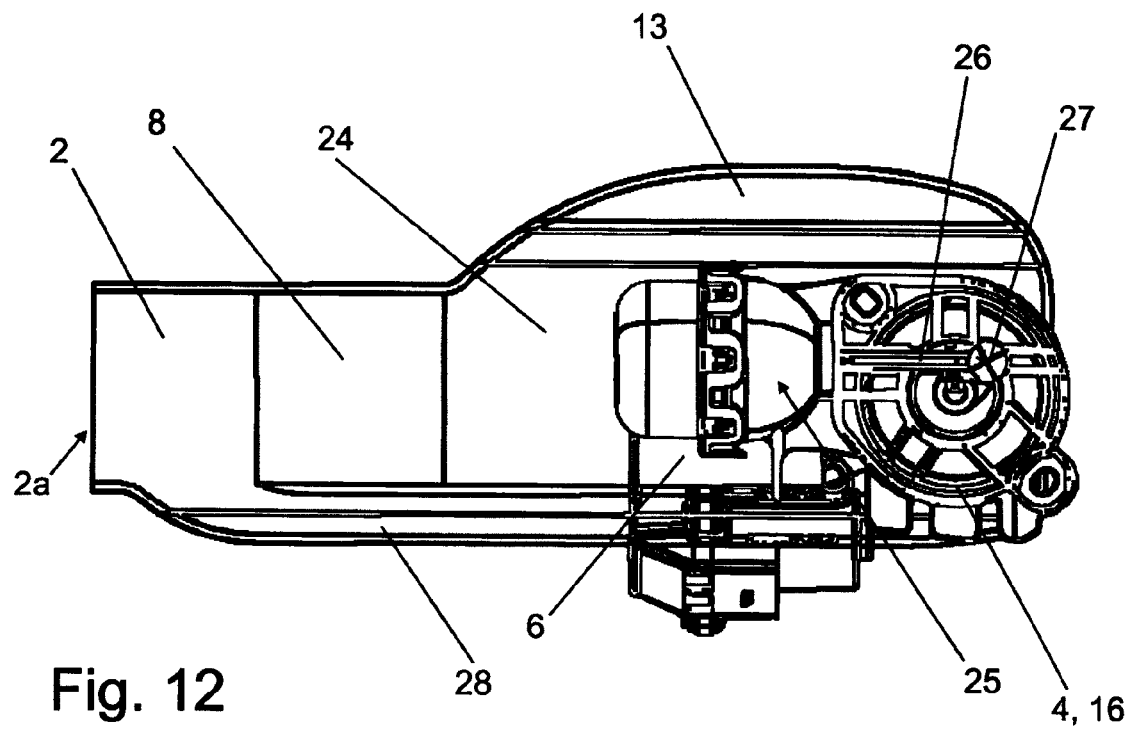

FIG. 12 shows a first lateral plan view of the embodiment from FIG. 10.

Figure 13:
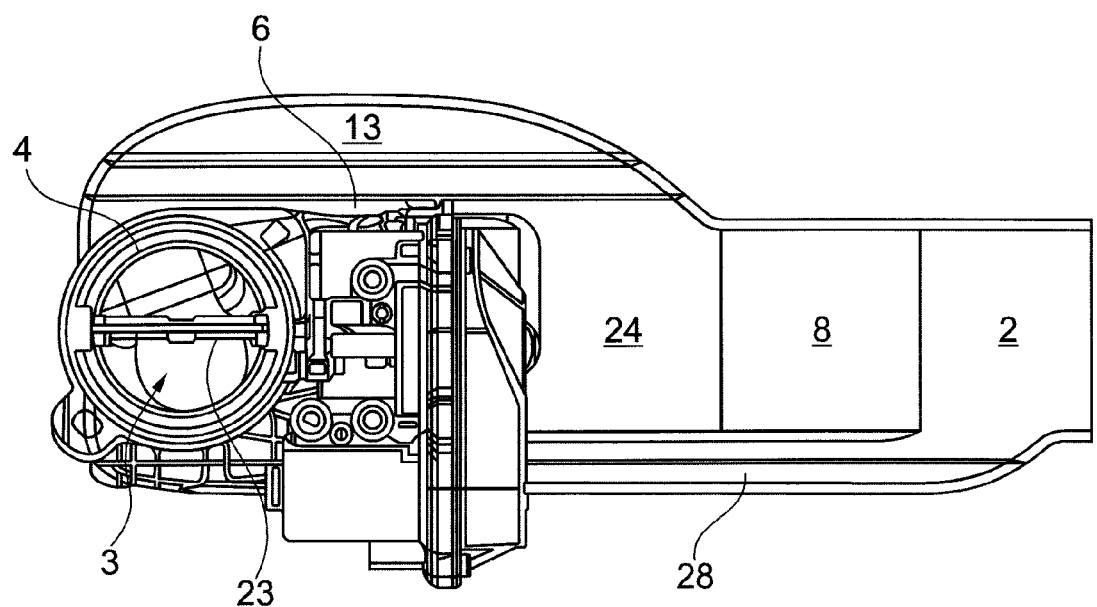

FIG. 13 shows a second lateral plan view of the embodiment from FIG. 10.

Figure 14:
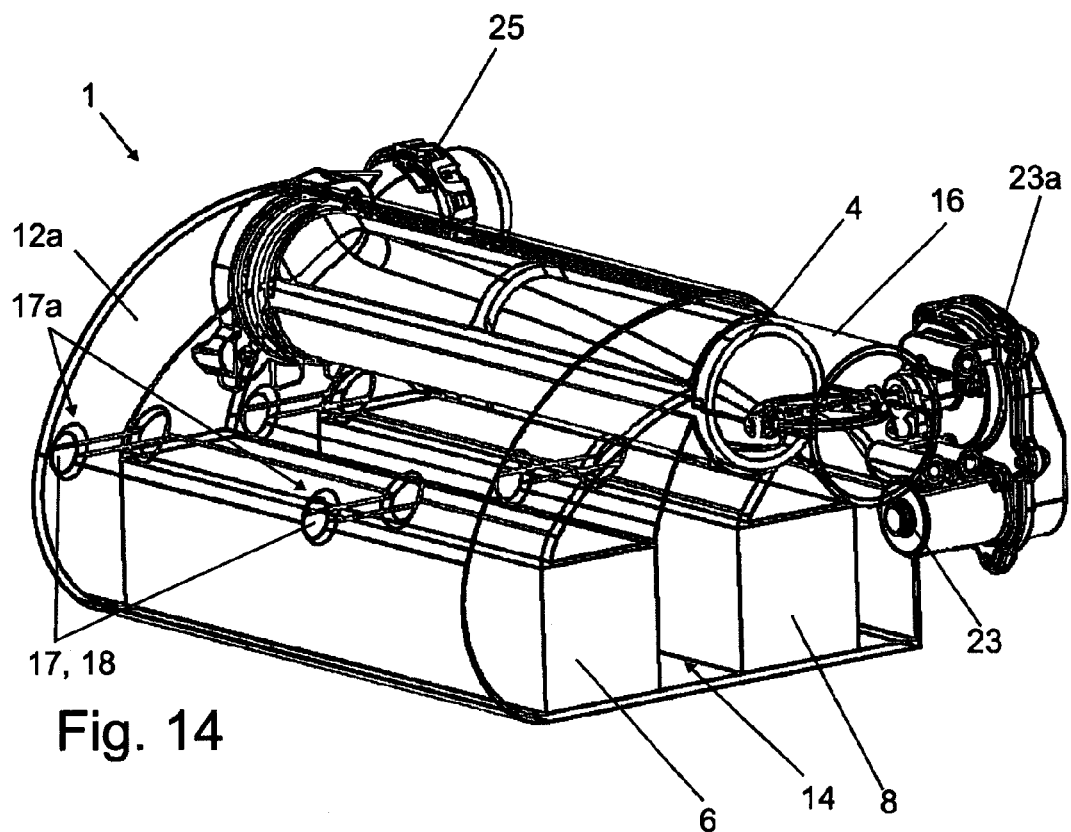

FIG. 14 shows a spatial view of a further embodiment of the invention.

Figure 15:
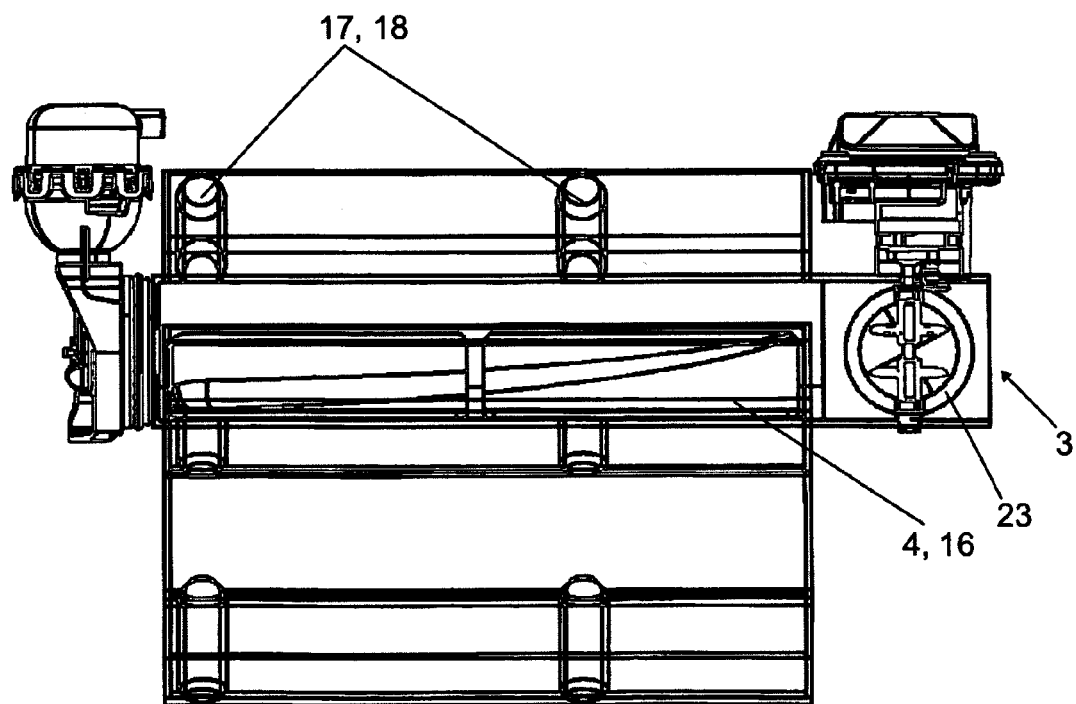

FIG. 15 shows a plan view from above of the embodiment from FIG. 14.

Figure 16:
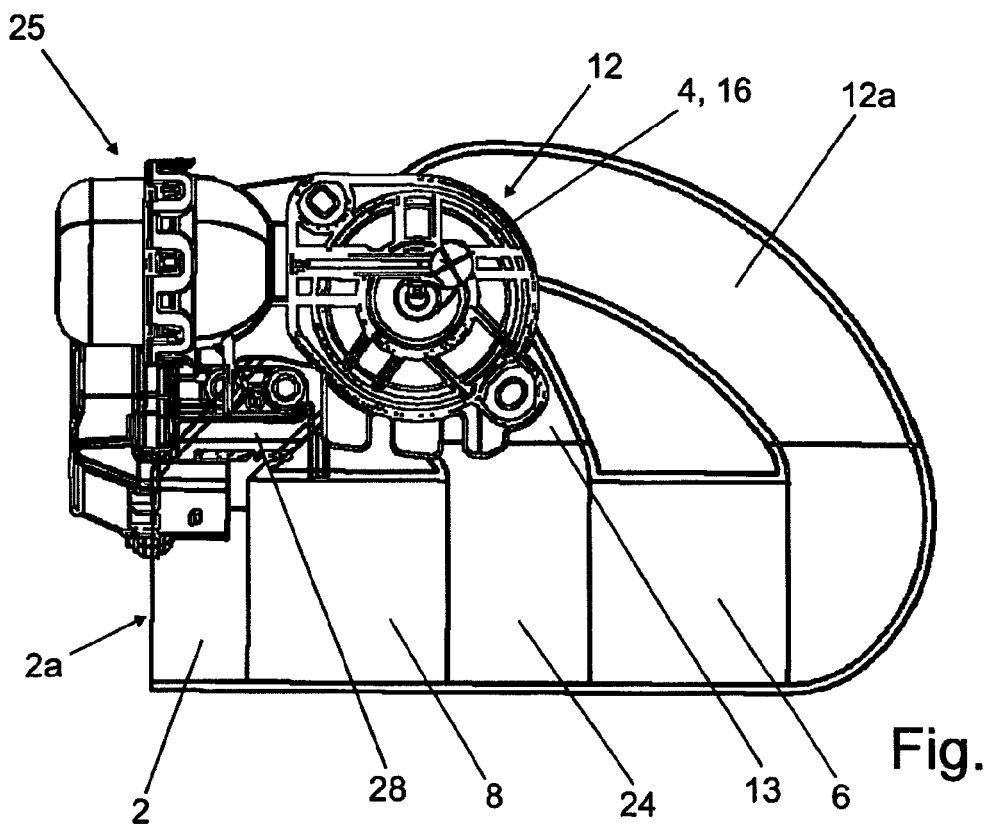

FIG. 16 shows a first lateral plan view of the embodiment from FIG. 14.

Figure 17:
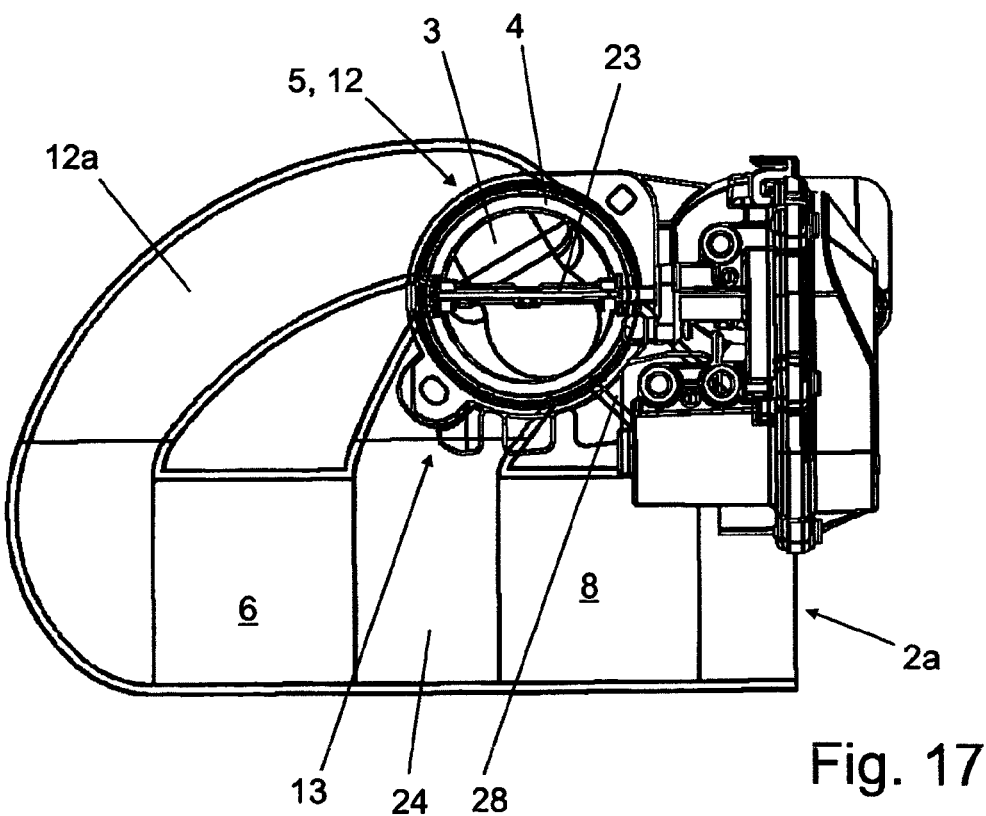

FIG. 17 shows a second lateral plan view of the embodiment from FIG. 14.

DETAILED DESCRIPTION

FIG. 1 shows a schematic depiction of a first embodiment, in which a charge air duct comprises a first heat exchanger 6 and a second heat exchanger 8. The first heat exchanger 6 is in the form of a high temperature charge air cooler (HT-LLK), and the second heat exchanger 8 is in the form of a low temperature charge air cooler (NT-LLK). In the example according to FIG. 1, the two heat exchangers 6, 8 are disposed one above the other, wherein the charge air is redirected by 180° in a redirection region 7 as it flows from the first to the second heat exchanger.

From the inlet 3, the charge air is routed to various paths by an actuator 4, depending on the position thereof.

In a first position, the charge air is routed to the first heat exchanger 6, and then through the deflection region 7 to the second heat exchanger 8.

In a second position, the charge air is routed to a first bypass 13, via which the first heat exchanger 6 is circumvented, and therefore the bypass 13 leads upstream of the second heat exchanger 8.

In a third position of the actuator 4, the charge air is routed to a second bypass 28 which leads downstream of both heat exchangers 6, 8 into a collector region 2 of the charge air duct.

FIG. 2 shows a second schematic embodiment, in which, in contrast to FIG. 1, the two heat exchangers 6, 8 are situated one behind the other in a plane. The redirection region 7 between the two heat exchangers 6, 8 is therefore eliminated.

FIG. 3 shows a structural embodiment of a charge air duct, as an example, according to FIG. 1. The charge air duct according to FIG. 3 to FIG. 4 is in the form of an intake manifold of an internal combustion engine, in which a housing 1 of the charge air duct, which is made of polyamide, encloses a collector region 2 which is flange-mounted via a charge air outlet 2a to a cylinder head of an internal combustion engine, which is a diesel engine in the present case.

The housing 1 has an inlet 3 into which the charge air flows, which has been compressed and heated by a compressor, e.g. an exhaust gas turbocharger. The inlet 3 has a circular cross section in the present case and extends into a cylindrical duct 16, in which an actuator 4 designed as a roller is positioned. The actuator 4 encloses a hollow roller which can be rotated using a non-depicted actuator, in the wall of which an opening 5 is provided. The wall of the hollow roller 4 is a radially directed outlet opening for the charge air which, after entering the housing, flows axially into the hollow roller 4 and then, redirected by substantially 90°, exits the hollow roller 4 through the opening 5.

A plurality of passages 12, 13, 28 is provided in the cylindrical duct 16, via which the opening 5 is closed depending on the rotational position. To prevent leakage flows of charge air, a plurality of seals 14 is also provided in the wall of the cylindrical duct 16, which are in the form of sealing strips integrally cast onto the housing material in the present example.

To provide the housing 1 and, in particular, the position of the seals 14 with adequate stability with respect to the charge air pressure and other influences, a tension rod 15 is also provided on the housing 1 in the vicinity of the cylindrical duct 16.

In a first position of the actuator according to FIG. 3, the opening 5 overlaps a first passage 12 in the housing 1. The charge air flows through the opening 5 of the actuator 4 to a first liquid-cooled heat exchanger 6 disposed in the housing 1, which is followed by a redirection region 7 and, after redirection by 180°, a second heat exchanger 8. When the charge air flows through the heat exchangers 6, 8, thermal energy therefrom is dissipated to the cooling fluid of the heat exchangers.

In the present case, the heat exchangers 6, 8 are in the form of various regions and sections of an individual heat exchanger insert 9 which has only one inflow and one outflow for cooling fluid. Alternatively, however, two separate heat exchangers can be provided, each of which has an inflow and an outflow for identical cooling fluid or different cooling fluid. As a result, the separate heat exchangers can be operated, in particular, with cooling fluids having different temperatures, to increase the efficiency of the charge air cooling. The design of the charge air duct with respect to the heat exchangers can also be referred to as a U-flow cooler (see also the schematic example according to FIG. 1).

After exiting the further heat exchanger 8, the charge air flows through the collector region 2 and enters the internal combustion engine.

In a second position of the hollow roller 4, the path to the first passage 12 through the wall of the hollow roller, as a blocking surface, is closed, and the opening 5 overlaps a second passage which is the beginning of a duct-shaped, first bypass 13 which extends along the outside. The bypass 13 leads into the redirection region 7, i.e. downstream of the first heat exchanger 6 and upstream of the second heat exchanger 8. As a result, only the first of the two heat exchangers 6, 8 is circumvented in the second position of the actuator 4. Such an operating mode is selected when switching from full load to part load, for example. In this case, a portion of the charge air cooling is omitted or, under certain circumstances, heating of the charge air, which has been heated to a lesser extent in part load operation, by the first heat exchanger 6 is prevented altogether. At the same time, the pressure drop is diminished by circumventing one of the heat exchangers, thereby improving the overall efficiency of part load operation.

In a third position of the hollow roller 4, the path to the first passage 12 and to the second passage 13 is closed by the wall of the hollow roller as a blocking surface, and the opening 5 overlaps a third passage 28 which is provided as a second bypass in a wall of the collector region 2 adjacent to the cylindrical duct 16. In this position, the charge air therefore flows directly from the inlet 3 through the hollow roller 4 into the collector region 2, and therefore cooling by the heat exchangers 6, 8 does not take place. Such an operating mode is selected in a cold start phase, for example, to enable the operating temperature of the internal combustion engine to be reached quickly.

In particular, the charge air can be admixed with a portion of recirculated exhaust gas. The exhaust gas can be added before entry into the charge air duct according to the invention, or in the charge air duct itself (not depicted).

In a further position of the hollow roller 4, the opening 5 is opposite the wall of the cylindrical duct 16, and therefore the flow cross-section of the charge air is closed or reduced completely.

In an intermediate position which is not shown, the opening 5 can overlap only partially with one of the passages 12, 13, 28, thereby resulting in an adjustable, stepless reduction of the flow cross-section or an adjustable throttling of the charge air flow. To ensure high accuracy of the setting, the blocking surface or the wall of the hollow roller adjacent to the opening 5 does not have a smooth edge, but rather a geometric structure in the form of a serration 14 (see FIG. 4). The serration can also be angled in the direction of the roller center, to prevent the roller 4 from getting stuck on the housing 1 during rotation.

For gasoline engines, the use of a rotary throttle can also be interesting due to the restrictions on installation space, although it should be possible to attain more accurate throttling for this purpose, e.g. using larger serrations.

A feature common to the embodiments according to FIG. 5 to FIG. 17 described below is that two rows of screw connections 17, which are parallel in the present case, are provided for installation on the cylinder head of a three-cylinder engine, i.e. two upper screw connections 17a and two lower screw connections 17b. The screws or tension rods used to mount the charge air duct on the cylinder head are not depicted.

The two parallel rows of screw connections are separated by a distance of 90 mm (as measured from the center of the ducts) in the present case. The outer diameter of the hollow roller 4 is similar in the embodiments, and is between 60 mm and 65 mm.

Each of the embodiments FIG. 5 to FIG. 17 has, as in the first embodiment, a first heat exchanger 6 and a second heat exchanger 8. Also present in each case is a first passage 12 and a second passage or bypass 13, and the basic function of the actuator 4 in the form of a hollow roller 4 is likewise identical in each case.

The examples according to FIG. 5 to FIG. 17 correspond to the scheme of the example according to FIG. 2, in which the two heat exchangers 6, 8 are disposed in a plane one behind the other. Therefore, there is no redirection region between the heat exchangers. Each of the two heat exchangers 6, 8 is disposed between the rows of screw connections 17. This limits the height of the heat exchangers in a vertical direction H to less than 90 mm in the present case, although it usually permits extension in a longitudinal direction L corresponding to the entire width of the cylinder head.

The lower screw connections 17 extend underneath the charge air duct and do not collide with the housing, depending on the embodiment. They can interact at fastening tabs (not depicted) on the edge of charge air outlet 2a, for example.

The upper screw connections 17 extend, in sections, in recesses 18 in the form of beading formed as a single piece with and made of the same material as a second redirection region 19 of the charge air duct which also forms collector region 2. In all of the embodiments described, the charge air duct is made of plastic, thereby enabling the recesses 18 to be shaped in the injection molding procedure.

In each of the examples according to FIG. 5 to FIG. 17, at least one duct-shaped bypass 13 is provided, which starts at the roller-shaped actuator 4 and leads downstream of first heat exchanger 6 and upstream of the second heat exchanger 8. In each case, the first heat exchanger 6 is formed as a high temperature heat exchanger which is integrated in a cooling circuit of the engine coolant.

Typical coolant temperatures in an engine at operating temperature are in the range of 90° C. in the present case. The subsequent, second heat exchanger 8 is in the form of a low temperature heat exchanger connected to a low temperature branch of the cooling circuit. The coolant temperatures here are much lower and can reach the temperature of the ambient air. As an alternative or in addition thereto, it is also feasible for refrigerant of a refrigeration circuit to flow through the low temperature heat exchanger.

Another feature common to the embodiments according to FIGS. 5 to 17 is a throttle element 23 disposed upstream of the roller-shaped actuator 4, which can be adjusted in a drivable manner via an electric-motor actuator 23a. In each case, the throttle element 23a is disposed in the same cylindrical duct 16 as the roller-shaped actuator 4, and is formed as a circular throttle valve, the shaft of which extends transversely through the cylindrical duct 16. By way of the throttle element 23a, the inlet 3 or cylindrical duct 16 can be completely blocked in such a manner that, in the case of a diesel engine, for example, the engine can be shut off using the throttle valve. As a result, complex sealing measures can be omitted with respect to the actuator 4, which would be necessary if the objective were to utilize only the actuator 4 to block completely. The throttle valve 23 can also be used to support the throttle setting in the range of extreme throttling, e.g. to generate sufficient vacuum for high pressure exhaust gas recirculation in the part load range downstream of actuator 4.

In the case of the embodiment according to FIGS. 5 to 9, the bypass 13 that leads upstream of the second heat exchanger 8 is the only bypass of the charge air duct. The charge air therefore always flows at least through the further heat exchanger 8 in every position of the actuator 4.

The cylindrical duct 16 comprising the actuator 4 and the two heat exchangers 6, 8 are situated substantially in a plane, according to the lateral plan view FIG. 7, and are disposed one behind the other in the flow direction of the charge air. The bypass 13 is formed as a flat, curved duct extending above this plane, which leads into an intermediate space 24 between the heat exchangers 6, 8.

Recesses 18 are formed in the bypass 13, via which upper screw connections extending through the housing 1 are provided. Lower screw connections extend entirely below housing 1.

Furthermore, an electric-motor actuator 25 for actuating the actuator 4 is disposed on the housing 1 on the side and at the end region of the cylindrical duct 16, which is opposite the throttle element 23. The actuator 25 comprises a linearly displaceable rod 26 which is connected via a spherical head mounting to a journal 27 of the roller-shaped actuator, which is eccentrically disposed relative to the rotational axis of the shaft 4. By way of the driven motion of the rod 26, the journal 27 and, therewith, the roller of the actuator 4, are displaced, thereby enabling the various above-described routes of the charge air to be selected.

In the embodiment according to FIGS. 10 to 13, a further, second bypass 28 is present, in contrast to the example according to FIG. 5 to FIG. 9. The arrangement of the actuator 4 and each of the heat exchangers 6, 8 in a plane is retained, as is the arrangement of the first bypass duct 13 above this plane. In addition, the further bypass duct 28 is now provided below the plane of the heat exchangers 6, 8 in a recess which is similar to the first duct and is flat and extends along the width of the housing 1. The second bypass 28 leads downstream of the two heat exchangers 6, 8, thereby enabling the charge air to be routed with complete circumvention of all heat exchangers 6, 8.

Analogously to the first bypass duct 13, the second bypass duct 28 comprises recesses 18 in which the lower screw connections of the charge air duct with the internal combustion engine are disposed.

In all, the actuator according to the embodiment according to FIGS. 10 to 13 therefore has an additional, fourth setting in which the charge air is routed through the second bypass 28 with complete circumvention of the heat exchangers 6, 8. As previously, the following applies: In the first position of the actuator, the charge air is routed from the inlet 3 through all heat exchangers 6, 8 to the outlet 2a. In the second position, the charge air is routed through the first bypass 13 with at least partial circumvention of the first heat exchanger, in particular with complete circumvention of the first heat exchanger 6. In the third position of the actuator 4, both heat exchangers 6, 8 are circumvented entirely using the second bypass 28. As in all of the other embodiments, in each of the positions, the routed charge air can be throttled specifically by partially overlapping the openings with the roller opening. FIGS. 14 to 17 show a further embodiment of the invention, in which, just as in the previous example according to FIGS. 10 to 13, a second bypass 28 and, in all, an identical function of the charge air duct are present. In contrast to the previous example, the components in the housing have a different spatial configuration, thereby resulting in a taller and shorter design which can be advantageous, depending on the requirements.

The two heat exchangers 6, 8 and the outlet 2a are still disposed one behind the other in a plane. The actuator 4 is not disposed in this plane, but rather below it. Three compartment-like ducts branch off from the cylindrical duct 16 of the actuator 4, namely a main duct 12a for routing the charge air through both heat exchangers 6, 8, the first bypass duct 13 to route the charge air from the inlet 3 to an intermediate space 24 between the heat exchangers 6, 8, and the second bypass duct 28 to route the charge air from the inlet 3 to the collector 2 or the outlet 2a, with complete circumvention of both heat exchangers 6, 8.

In this example, tunnel-shaped recesses 18 are provided for a row of screw connections which extend through the housing 1 between the plane of the actuator and the plane of the heat exchangers 6, 8. In an alternative embodiment, the actuator can be disposed below the heat exchangers 6, 8 instead of above the heat exchangers 6, 8 (e.g. by rotating the device by 180°.

For each of the above-described embodiments, the first bypass duct 13 and/or the second bypass duct 28, if present, can be formed using ribs extending parallel to the charge air flow, a honeycomb shape of the ducts or similar measures for improving the stiffness of the housing 1.

It is understood that the features of the individual embodiments can be combined with one another in an arbitrary manner depending on the requirements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A charge air duct for an internal combustion engine, comprising:
a housing having at least one inlet and at least one outlet for charge air,
wherein a first heat exchanger is disposed in the housing to cool the charge air,
wherein a bypass is disposed on the housing to at least partially circumvent the first heat exchanger,
wherein an actuator is disposed on the housing to influence the charge air flow,
wherein the charge air is guided from the inlet to the first heat exchanger in a first position of the actuator,
wherein the charge air is guided from the inlet to the bypass in a second position of the actuator, wherein the bypass leads upstream of a second heat exchanger of the charge air duct, and wherein a second bypass is provided, the second bypass leading from upstream of the first heat exchanger to downstream of the second heat exchanger, to thereby circumvent the first and second heat exchangers.

2. The charge air duct according to claim 1, wherein the first heat exchanger is in the form of a high temperature heat exchanger, and the second heat exchanger is in the form of a low temperature heat exchanger.

3. The charge air duct according to claim 1, wherein the charge air flows from the inlet to the second bypass in a third position of the actuator.

4. The charge air duct according to claim 1, wherein the charge air duct is in the form of an intake manifold of the internal combustion engine.

5. The charge air duct according to claim 1, wherein the actuator is disposed in a duct which is substantially cylindrical, wherein the charge air flow is redirected by approximately 90° in the region of the duct.

6. The charge air duct according to claim 1, wherein the actuator is in the form of a roller which is rotatable about an axis.

7. The charge air duct according to claim 1, wherein the actuator comprises a blocking surface, and wherein the blocking surface has a geometric structure to reduce the flow cross-section.

8. The charge air duct according to claim 1, wherein the housing can be attached to the internal combustion engine via two parallel rows of screw connections, wherein, at least one of the screw connections extends through a part of the housing.

9. The charge air duct according to claim 8, wherein at least one of the heat exchangers is disposed between the parallel rows of screw connections.

10. The charge air duct according to claim 1, wherein the charge air flow is redirected, in particular by 180°, after the heat exchanger of the two that is upstream, and before the heat exchanger of the two that is downstream.

11. The charge air duct according to claim 1, wherein the actuator is disposed substantially in a plane with the two heat exchangers and also in a plane with the outlet of the charge air duct.

12. The charge air duct according to claim 1, wherein the two heat exchangers and the outlet are disposed substantially in a plane, and wherein the actuator is disposed outside of this plane entirely above or entirely below the plane.

13. The charge air duct according to claim 1, wherein a throttle element is provided in addition to the actuator.

14. The charge air duct according to claim 1, wherein the entire actuator is located upstream of the first heat exchanger.

* * * * *